United States Patent [19]

Ura

[11] 3,911,492

[45] Oct. 7, 1975

[54] VIDEO TAPE RECORDING AND/OR REPRODUCING APPARATUS WITH AUTOMATIC TENSION RELEASE

[75] Inventor: Junichi Ura, Yokohama, Japan

[73] Assignee: Victor Company of Japan, Ltd., Yokohama, Japan

[22] Filed: Nov. 5, 1973

[21] Appl. No.: 412,681

[30] Foreign Application Priority Data

Nov. 7, 1972 Japan .............................. 47-110723

[52] U.S. Cl. .................... 360/85; 242/204; 242/190

[51] Int. Cl. .......................... G11b 5/008; G03b 1/04

[58] Field of Search ........... 360/93, 95, 84, 85, 132; 242/75.43, 75.44, 204, 190

[56] References Cited

UNITED STATES PATENTS

| | | | |
|---|---|---|---|
| 3,079,100 | 2/1963 | Brown | 242/75.44 |
| 3,373,951 | 3/1968 | Mazoyer | 360/95 |
| 3,380,680 | 4/1968 | Dunsheath | 242/75.43 |
| 3,678,217 | 7/1972 | Kihara | 360/132 |
| 3,784,761 | 1/1974 | Moritan | 360/95 |

*Primary Examiner*—Bernard Konick
*Assistant Examiner*—Jay P. Lucas

[57] ABSTRACT

A video tape recording and/or reproducing apparatus comprises a rotating drum wrappingly contacted over a specific angular extent around the cylindrical surface thereof by a traveling recording tape. When a power failure occurs during recording/reproducing, tape tension is removed to eliminate a load on the rotating drum. This tension is completely removed by releasing the braking force on the reel disc on the tape transport side which produces the tape tension load.

6 Claims, 2 Drawing Figures

VIDEO TAPE RECORDING AND/OR REPRODUCING APPARATUS WITH AUTOMATIC TENSION RELEASE

BACKGROUND OF THE INVENTION

This invention relates generally to a video tape recording and/or reproducing apparatus, and more particularly to means for releasing tension to remove a load from a recording head on power failure.

An apparatus of the inventive type has a recording or reproducing operation wherein a tape-form recording medium travels in wrapping contact around part of the cylindrical surface of a rotating drum. The wrap is over a specific angular extent. The drum rotates at high speed and has a transducer, such as a magnetic head. More specifically, the invention relates to a recording/reproducing apparatus, of the above defined type, wherein there may be a failure of the driving power for rotating the rotating drum and driving the tape-form medium. Responsive to such a power failure during recording or reproducing, a braking force is removed from the reel disc of the tape-supply side, or take-up side depending on the rotational direction of the drum. When the brake is completely removed, the tape tension is eliminated on the side of the tape which is imparting a load to the rotation of the drum. This prevents a sticking of the tape-form medium to the drum while it is still rotating under inertia.

In a recording/reproducing apparatus of the described type, in general, a recording medium in the form of a tape (hereinafter referred to as a "tape") is paid out from a roll on the tape supply side. At the time of recording or reproducing, the tape travels along a predetermined path including a portion where it is wrapped around and in contact with a rotating drum over a specific angular extent of the cylindrical surface thereof. The drum has a rotating magnetic head and rotates at a high speed. The traveling tape is finally taken up by a tape reel on the take-up side.

A predetermined back tension is imparted to the tape traveling in this manner, around and in contact with the rotating drum. For this reason, if a power failure or some other misoperation occurs during the recording or reproducing mode of operation, the tape will stop its travel in a state wherein a back tension is still imparted thereto. However, the rotating drum continues rotating for a short while because of its inertia. As a result, the tape will adhere closely to the cylindrical surface of the drum just before the drum stops rotating. Then if there should be any very fine droplets of water on the surface of the drum, the tape will stick to the drum. For example, the apparatus may be moved from a cold environment into a heated room. The succeeding operation, (e.g., an unloading operation), cannot be carried out in a normal manner. As a further result, the tape and the drum may be damaged.

Apparatus of the instant tape, in the prior art, have been accompanied by these difficulties.

Accordingly, there has been an unfulfilled demand for a recording/reproducing apparatus of the described type wherein tension is removed when the tape driving mechanism and the drum driving mechanism are both rendered inoperative, by a misoperation such as a power failure. Braking forces on the take-up side are completely removed to eliminate the tape tension on the side which becomes a load during the rotation of the drum.

SUMMARY OF THE INVENTION

Accordingly, it is a general object of the present invention to provide a novel and useful recording/reproducing apparatus of the described type which fully meets the above described demand.

A specific object of the invention is to provide a recording/reproducing apparatus of a rotating drum type wherein when tape tension is removed there is a power failure. Here an object is to remove a braking force on the reel disc relating to the side which becomes a load with respect to the rotational direction of the rotating drum. This provision prevents a sticking of the tape as it is wrapped around a specific angular extend of the rotating drum. In particular, an object is to prevent sticking while the drum is rotating under inertia after an interruption of the power supply.

Another object of the invention is to provide a recording/reproducing apparatus with a solenoid which is normally operated by the power supply for the driving motor of the rotating drum. The braking force which causes a tape back tension is removed by the release of the solenoid which automatically follows power failure.

Still another object of the invention is to provide a recording/reproducing apparatus in which the power supply may be interrupted during a recording/reproducing operation. The braking means is automatically put in a brake released state with respect to a reel disc, which is prevented from returning to its braking state.

Further objects and features of the invention will become apparent from the following detailed description of a preferred embodiment of the invention, when read in conjunction with the accompanying drawings.

DETAILED DESCRIPTION

Figure 1:
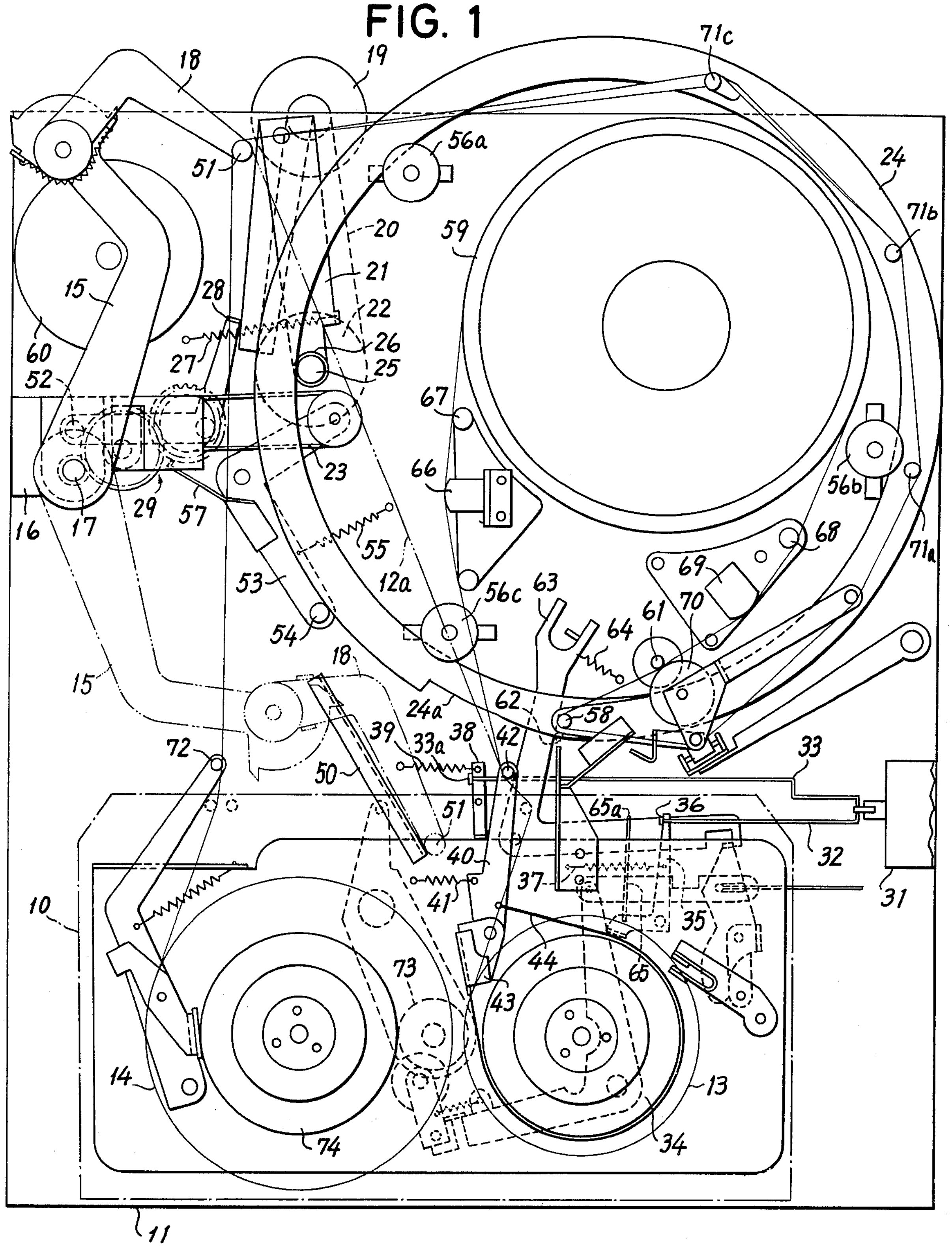
FIG. 1 is a plan view of one preferred embodiment of the rotating drum type recording/reproducing apparatus according to the present invention, here shown in its recording/reproducing mode of operation.

In the recording/reproducing apparatus illustrated in FIG. 1, a tape cassette 10 is loaded in a specific position on the chassis 11. It contains a supply side tape roll 13 and a take-up side tape roll 14, on which a magnetic tape 12 is wound. An L-shaped guide lever 15 is fixed at one end to the upper end of a rotatable shaft 17 which is held rotatably and vertically by a holding structure 16. At its opposite end, lever 15 pivotally supports one end of another L-shaped guide lever 18, which is thereby free to rotate within a specific angular range.

When a PLAY button (not shown) of the apparatus is depressed, a motor 19 rotates for loading. The output power is transmitted by way of a belt 20, as a clockwise rotation, to a pulley 22 which is rotatably supported on the distant end of the upper arm of a U-shaped or yoke-like lever 21, having parallel upper and lower arms.

This rotation of the pulley 22 causes driving rollers 26 and 25, confronting a belt 23 and a revolving ring 24, respectively, to rotate unitarily. The lever 21 is urged to rotate in a clockwise direction by a spring 27. When the apparatus is in an unoperated state, the lower arm of lever 21 is caught by a bent portion of an L-shaped lever 28 and is thereby restricted in its rotation. At this time, the ring driving roller 25 is separated from the inner circumferential surface of the revolving ring 24. The belt driving roller 26 is pressed against the belt 23.

Consequently, the rotation of the motor 19 is transmitted by way of the belt 20, the driving roller 26, and the belt 23 to a pulley. Then, by way of a speed reducing mechanism 29, within the holding structure 16, the motor power reaches the rotatable shaft 17 which turns in a counterclockwise rotation at reduced speed. In this manner, the loading operation is started, as described hereinafter.

As another result of the above mentioned depressing of the PLAY button (not shown), a solenoid 31 is supplied with a current and operates to move connecting rods 32 and 33 together toward the right as viewed in FIG. 1. As a result of this movement of the rod 32, an L-shaped brake lever 35 is moved to the position indicated by the two-dot chain line in FIG. 2. Then, lever 35 is imparting a braking force to a supply reel disc 34 by means of a brake shoe on the distant end of one arm of the brake lever 35. At the other end of the other arm, lever 35 engages a member 36 provided at the outer end, or left end as viewed in FIG. 2, of the rod 32. Lever 35 is thereby rotated counter to the force of a spring 37 to the position indicated by a full and solid line in FIG. 2, whereupon the braking force of the brake lever 35 on the reel disc 34 is removed.

As a result of the above mentioned movement of the rod 33, a rotatable lever 38, pivoted at its middle part, is engaged at one end thereof by a bent part 33*a* at the outer end of the rod 33. Rod 33 is thereby rotated clockwise against the force of a spring 39, from the position indicated by the two-dot chain line to the position indicated by the full or solid line in FIG. 2. This rotation of the lever 38 causes a supply-side tension lever 40 to be released from its engagement with a bent part of the lever 38. Lever 38 is rotated by a spring 41 from the position indicated by the two-dot chain line to that indicated by the full or solid line in FIG. 2.

As a result, a tension pole 42 reaches its operating position. A brake band 44 is anchored at one end to a holder 43 fixed to the chassis 11 and at the other end to a pin fixed to the tension lever 40. Brake band 44 surrounds the reel disc 34 and is tensioned to restrain and thereby tension the tape. Consequently, the braking mechanism for the supply reel disc 34 assumes the state indicated in FIG. 1. The braking force due to the brake lever 35 is removed, while the servomechanism, wherein the tension lever 40 and the brake band 44 function cooperatively, assumes an operating state.

During the above described operational state and the succeeding loading operation as described below, stopping control is effected. The solenoid 31 is deenergized and the servomechanism is unoperative with respect to the supply reel disc 34. These parts return to the original state wherein a braking force is applied by the brake lever 35.

As a result of the aforementioned rotation of the shaft 17, the L-shaped lever 15 is rotated in the counterclockwise direction from the position indicated by the two-dot chain line in FIG. 1. The L-shaped lever 18 is rotated counterclockwise while it is rotated clockwise relative to the lever 15 and as it is guided by a guide member 50. During this operation, a guide pole 51, fixed to the free end of the lever 18, is extracted from the interior of the cassette 10. It catches the tape 12 and draws it out of the cassette. When the L-shaped levers 15 and 18 are rotated to their positions indicated by the full line in FIG. 1, the tape 12 is drawn outside of the cassette and formed into a tape loop 12*a* of a substantially triangular shape.

During the operation, a pin 52 fixed to the outer end of one arm of the L-shaped lever 28 fits into a recessed part of a cam (not shown) rotatable unitarily with the aforementioned shaft 17. The lever 28 is rotated counterclockwise by a spring 27. In conjunction with this action, the U-shaped lever 21 rotates in an intercoupled manner in the clockwise direction. The driving roller 25 presses against the internal circumferential surface of the ring 24. The output rotation of the motor 10 is thereby transmitted through the driving roller 25 to the ring 24, which thereupon starts to rotate in the clockwise direction.

As the ring 24 thus starts to rotate, an L-shaped lever 53 is rotated clockwise against the force of a spring 55. A pin 54 fixed to the outer end of one arm of this lever 53 lifts out of a recessed portion 24*a* formed in the outer peripheral edge of the ring 24 and reaches a position of contact against the outer peripheral edge of the ring. As a consequence, the belt 23 separates from the driving roller 26 to remove the driving power transmitted to the shaft 17. The revolving ring 24 thereafter revolves by itself. As a result of the clockwise rotation of the L-shaped lever 53, the outer free end of a lock lever 57, fixed at its base part the one arm of the lever 53, enters the space between two teeth of one gear forming the speed reducing mechanism 29. The shaft 17 and L-shaped levers 15 and 18 are positively locked in their positions, as indicated by the full line in FIG. 1. The revolving ring 24 is revolvably supported with an inclination such that the right lower side thereof as viewed in FIG. 1, is at the lowest position due to the guide rollers 56*a*, 56*b*, and 56*c*.

As a result of the revolving of the ring 24, a tape guide pole 58, revolving together therewith advances into a tape loop 12*a* from the underside. As the pole 58 withdraws out of this loop, it catches the tape 12. As a continuous action in accordance with the revolving motion of the ring 24, pole 58 pulls the tape 12 around the cylindrical surface of a guide drum 59. The guide drum 59 is made up of an upper guide drum and a lower guide drum, which is fixed to the chassis 11. The upper guide drum is separated very slightly from the lower guide drum. A rotary video head is positioned between the upper and lower drums and is exposed outwardly from its cylindrical surface. A main motor 60 rotates the upper guide drum at high speed in the clockwise direction, as viewed in FIG. 1. Similarly, a capstan 61 is rotated at a constant speed in the clockwise direction by this main motor 60.

Figure 2:
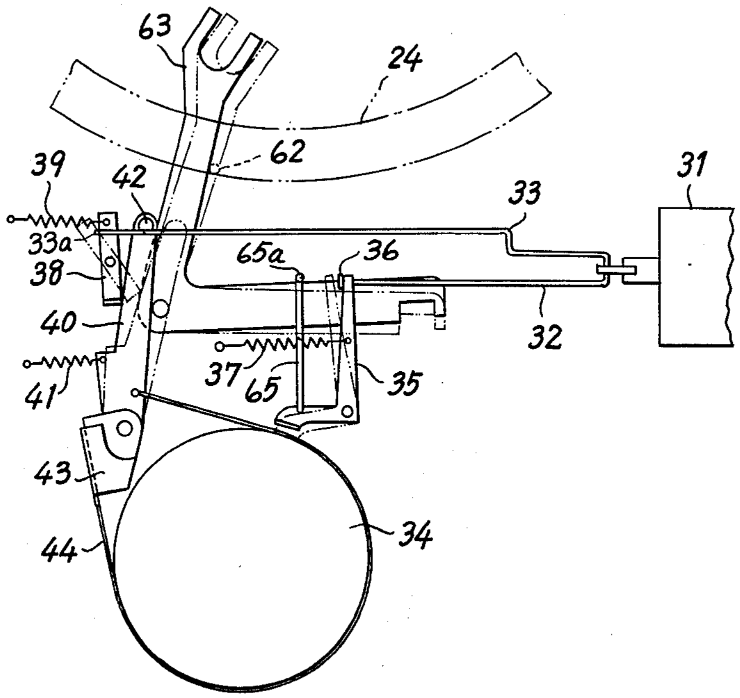
FIG. 2 is a fragmentary plan view of a description of the operation of a mechanism for releasing all braking forces on the tape supply reel disc when a power failure occurs with the apparatus in the recording/reproducing mode indicated in FIG. 1.

When the revolving ring 24 revolves to the terminal position indicated in FIG. 1, as it pulls around the tape 12, an engagement pin 62 fixed to the lower surface thereof, at a specific position, strikes against one arm of an L-shaped ring lever 63 in the rotational position indicated by the two-dot chain line in FIG. 2. The lever 63 is rotated against the force of a spring 64 to the position indicated by the full line in FIG. 2, and the position shown in FIG. 1. As a consequence of this rotation of the lever 63, one edge (the upper edge as viewed in FIG. 2) of its arm, extending toward the solenoid 31, comes into contact with and engages a bent part 65*a* at one end of a rod 65. The other end of rod 65 is fixed to one arm of the brake lever 35, thereby to limit the counterclockwise rotation of the brake lever 35. Thus, in this state of the mechanism, the brake lever 35 is restrictively held in its released position by both the ring lever 63 and the solenoid 31.

As a result of the revolution of the ring 24 to the above mentioned position, the operation of loading the magnetic tape 12 in the predetermined tape path is completed. The magnetic tape 12, which has been drawn out of the cassette 10 and from the supply side tape roll 13 within the cassette, is maintained at a constant tension by the tension pole 42. This tape 12 is placed in wrapping contact with an erasing magnetic head 66. The guide poles 67 and 68 wrap it in a helical form around the guide drum, over a specific angular range of the cylindrical surface of the drum. Tape 12 is placed in wrapping contact with an audiocontrol magnetic head 69, and is clamped between and driven by the capstan 61 and a pinch roller 70. The tape thus sent out from this part is caused by the tape guide pole to invert its direction of advance. The tape is guided by guide poles 71*a*, 71*b*, and 71*c* fixed to the upper face of the revolving ring 24, passes by the guide pole 51, is maintained at constant take-up side tension by a tension pole 72, enters the cassette 10, and is taken up on the take-up side tape roll 14.

In the above described state, the apparatus is changed over to the recording or reproducing mode of operation, and recording or reproducing of video signals on the tape is carried out by the rotating video head.

When a power failure occurs during the above described loading operation, the solenoid releases. Relative to the supply reel disc 34, the servomechanism returns to the original state wherein a braking force is imparted by the brake lever 35. Relative to the take-up reel disc 74, the tension servomechanism is maintained in the released state.

Next to be described is the operation of the recording/reproducing apparatus if there is trouble such as a power failure or a switching off of the power supply circuit by mistake.

When such a power failure occurs, the main motor 60, the solenoid 31, and like components are no longer supplied with power and are instantaneously released. Consequently, at this time, the clamping and driving of the magnetic tape 12 by the capstan 61 and the pinch roller 70 is terminated. Furthermore, in an intercoupled manner, the tension servomechanism on the take-up side is released and the take-up reel disc 74 is released completely from the braking force.

On one hand, the upper drum of the guide drum 59 is rotating because of its own inertia and the inertia of the motor 60. At this time, the rotation transmitting action of driving the take-up side tape roll 14 in the take-up direction becomes a load. For this reason, the upper drum continues rotating for a number of seconds and then stops. When the upper drum thus rotates under inertia, the lubrication formed by a thin air film layer between the guide drum and the tape wrappingly disposed around the cylindrical surface thereof at the time of the recording/reproducing operation disappears. The sliding frictional resistance increases between the upper drum and the tape, which has stopped moving.

Furthermore, when the solenoid 31 is deenergized and releases, the holding force no longer acts to hold both of the rods 32 and 33 at their positions to which they have moved rightward as viewed in FIG. 2. As a result, the lever 38 is rotated counterclockwise by the spring 39 to the position indicated by the two-dot chain line in FIG. 2, and both of the rods 33 and 32 move leftward. As a result of this rotation of the lever 38, the tension lever 40 is engaged by the bent part of the lever 38 and rotated clockwise to the position indicated by the two-dot chain line in the same FIG. 2, and the brake band 44 is released.

On one hand, the brake lever 35, which is being subjected to a counterclockwise torque by the spring 37, is released from its engagement by the engagement member 36. However, it is limited in rotation at its position indicated in FIG. 1 since the bent part 65*a* of the rod 65 is caught by the ring lever 63. Accordingly, the braking force on the supply reel disc 34 is completely removed responsive to a power failure. As a result, the upper drum of the guide drum 59 continues to rotate under inertia. As the rotational speed of the upper drum progressively decreases, the air film disappears from between the drum and tape, and the sliding frictional resistance increases between the upper drum and the tape wrapped around the drum. This frictional resistance causes the magnetic tape 12 to be drawn out slightly from the supply side tape roll 13 without being subject to any back tension whatsoever.

As a result of this tape drawing out action, the portion of the tape wrapped around the upper drum slackens, and the contact between the tape and the guide drum is terminated. For this reason, the magnetic tape is prevented from adhering closely or sticking to the cylindrical surface of the upper drum as it rotates under inertia during the time interval after a power failure and before the upper drum comes to a full stop.

It is to be noted that this invention can be similarly embodied by an apparatus of the type wherein the entire guide drum rotates together with a head provided thereon.

Furthermore, at the time of a power failure in the above described apparatus, the mechanisms of the control system comprising parts such as control buttons and levers return to their original states. For this reason, when power is again supplied to the apparatus, the motor 60 rotates in the same direction as that for the recording/reproducing operation. the loading motor 19 rotates in the direction opposite to the direction of loading and the unloading operation is carried out as described hereinafter. Since the tape 12 is not stuck to the drum 59 at this time, the upper drum is rotated without being subjected to the sliding resistance of the tape. This eliminates the undesirable damaging of parts such as the scarring of the magnetic surface of the tape 12 or head surface of the rotating video head and/or the restraint of the upper drum which cannot be rotated if the tape is adhering thereto.

When the ring 24 begins to revolve counterclockwise interrelatedly with the unloading operation, the ring lever 63 is released from its engagement by the engagement pin 62 and is rotated by the spring 64 to its original position indicated in FIG. 1. As a result of this rotation of the lever 63, the rod 65 is released from the engaged state at its bent part 65*a*, and the brake lever 38 is rotated counterclockwise by the spring 37. Consequently, a braking force is applied to the supply reel disc 34.

the unloading operation is accomplished by the various loading means respectively operating in the sequence and directions which are reverse to those in the aforedescribed loading operation. The magnetic tape 12 drawn out of the cassette 10 is successively wound, without slackening, on the tape roll 14 on the take-up side by the take-up reel disc 74 responsive to a counterclockwise torque imparted thereto by a driving roller 73, the tension servomechanism being released. The tape 12 is thus drawn into and accommodated within the cassette 10.

In the apparatus of the above described embodiment, the upper drum rotates in the same direction as the direction of travel of the tape, wrappingly contacting this drum. The tape drawn out from the tape roll on the supply side during the rotation of the guide drum acts as a load. For this reason, the braking force on the supply reel disc 34 is fully removed at the time of power failure during the recording/reproducing operation, in order to prevent sticking of the tape to the upper drum.

However, in a recording/reproducing apparatus, the upper drum rotates in a direction opposite to that of the travel of the tape wrappingly contacting the drum. The tape taken up on the tape roll on the take-up side becomes a load during the rotation of the guide drum. The braking force on the take-up reel disc is completely removed when a power failure occurs during the recording/reproducing operation. For this reason, during the rotation of the upper drum due to inertia, the tape is separated from the drum, and the drum rotates without being subjected to the load of the tape.

Furthermore, at the time of unloading, a torque in the tape take-up direction is imparted to the supply reel disc. The tape drawn out of the cassette is successively wound on the tape roll on the supply side and thus accommodated in the cassette.

In the above described embodiment, the brake lever 35 is adapted to be changed over between the operated and released states, by the solenoid 31 as it is activated by the control action of the electrically controlled mechanism and the solenoid 31, and mechanically coupling the solenoid 31 and the brake lever. However, it is also possible to provide an arrangement wherein the control mechanism is coupled mechanically to a brake lever (corresponding to the brake lever 35 in the above described embodiment) and connected mechanically and, at the same time, electrically to a solenoid (corresponding to the solenoid 31 in FIG. 1).

In an apparatus of this arrangement, the brake lever is moved directly to its released position by the change-over control action to the recording or reproducing mode of operation. Moreover, it is held in the released position through the control mechanism part locked by the solenoid. Furthermore, the brake lever is returned to its original operated position in an intercoupled action with the control mechanism which is released from its locked state due to the solenoid by the stop action.

The apparatus of the present invention has been described above with respect to an embodiment thereof as applied to a recording/reproducing apparatus of an automatic tape loading type. However, the apparatus of the invention can be similarly applied to a recording/reproducing apparatus of the type wherein the tape is loaded manually. Either way, the tape follows a prescribed tape path including a portion where the tape wrappingly contacts a rotating guide drum over a specific angular extent thereof. The apparatus can be thus applied by providing a lever corresponding to the ring lever 63 in the above described embodiment which is operated at a time such as that of change-over control to the recording/reproducing mode of operation.

Further, this invention is not limited to these embodiments but variations and modifications may be made without departing from the scope and spirit of the invention.

What is claimed is:

1. A video tape recording and/or reproducing apparatus comprising:

a rotating cylindrical drum containing at least one transducer head, a tape recording medium wrapped around a predetermined angular section of the cylindrical surface of said drum;

means including a motor for driving said rotating drum to rotate in one direction and at a specific speed;

means for paying said tape recording medium from one reel, to wrap around said rotating drum section, and thereafter to be taken up on another reel;

braking means for imparting a braking action to a reel disc on which one of said reels is mounted, said one reel being a load on the rotating drum when the rotational direction is that occurring during the recording and/or reproducing mode; and brake releasing means operating responsive to an interruption of the power supply to the motor during the recording and/or reproducing mode to remove the braking action of said braking means with respect to the reel disc, the reel disc being thus released from the braking action to prevent imparting excessive tape tension to the rotating drum turning under its inertia after the interruption of power supply to the motor.

2. A recording and/or reproducing apparatus as set forth in claim 1 in which said brake releasing means comprises solenoid means which is deenergized by interruption of its power supply simultaneously with said interruption of the power supply to said motor and a means responsive to said deenergizing of said solenoid means to remove the braking action of the braking means.

3. A recording and/or reproducing apparatus as set forth in claim 1 and means for operating said braking means in accordance with the tension of the tape recording medium being pulled from the reel which becomes a load upon said rotating drum to impart a small and variable braking action upon the reel disc thereby to maintain a constant tension, and second braking means for applying a braking action to stop and hold said reel disc when the recording/reproducing apparatus is unoperated; and means for operating said brake releasing means responsive to an interruption of the power supply to said motor to release said first braking means and to hold said second braking means which is in the brake releasing state.

4. A recording and/or reproducing apparatus as set forth in claim 1 in which said braking means comprises means for applying a brake for holding said reel disc when said apparatus is unoperated; and said brake releasing means comprises first holding means for holding said brake applying means in a released state while power is being supplied to said motor and for no longer holding the same in said released state when said power supply is interrupted, and second holding means for holding said braking means in a released state when said first holding means is no longer held in said released state while said apparatus is operated.

5. A recording and/or reproducing apparatus as set forth in claim 4 in which said first holding means comprises solenoid means operated when power is supplied to said motor to hold said braking means in a released state and becoming unoperated responsive to an interruption of the power supply to said motor; and said second holding means comprises a mechanism which is displaced when the apparatus is in an operated state thereby to engage and hold said braking means in a brake releasing state responsive to the unoperated solenoid means.

6. A recording and/or reproducing apparatus as set forth in claim 5 which further comprises loading means for automatically pulling and loading said tape recording medium in a predetermined tape path, and said holding mechanism being displaced by the loading operation of said loading means to a position for engaging and holding said braking means.

* * * * *